United States Patent
Zhuang et al.

(10) Patent No.: US 7,850,869 B2
(45) Date of Patent: Dec. 14, 2010

(54) ALUMINATE PHOSPHOR CONTAINING BIVALENCE METAL ELEMENTS, ITS PREPARATION AND THE LIGHT EMITTING DEVICES INCORPORATING THE SAME

(75) Inventors: Weidong Zhuang, Beijing (CN); Yunsheng Hu, Beijing (CN); Zhen Long, Beijing (CN); Shusheng Zhang, Beijing (CN); Xiaowei Huang, Beijing (CN); Hongwei Li, Beijing (CN)

(73) Assignees: General Research Institute for Nonferrous Metals, Beijing (CN); Grirem Advanced Materials Co., Beijing (CN)

( * ) Notice: Subject to any disclaimer, the term of this patent is extended or adjusted under 35 U.S.C. 154(b) by 0 days.

(21) Appl. No.: 12/465,381

(22) Filed: May 13, 2009

(65) Prior Publication Data

US 2009/0218585 A1 Sep. 3, 2009

Related U.S. Application Data

(63) Continuation of application No. PCT/CN2007/003205, filed on Nov. 13, 2007.

(51) Int. Cl.
*C09K 11/78* (2006.01)
(52) U.S. Cl. .............. 252/301.4 R; 252/301.4 H; 313/503; 257/98
(58) Field of Classification Search .......... 252/301.4 R, 252/301.4 H; 313/503; 257/98
See application file for complete search history.

(56) References Cited

U.S. PATENT DOCUMENTS 5,998,925 A * 12/1999 Shimizu et al. .............. 313/503

6,409,938 B1 * 6/2002 Comanzo ............... 252/301.4 R
2008/0138268 A1 * 6/2008 Tao et al. .................... 423/263

FOREIGN PATENT DOCUMENTS

| CN | 1482208 | | 3/2004 |
| CN | 1818016 | | 8/2006 |
| JP | 49-20086 | * | 2/1974 |
| JP | 49-20087 | * | 2/1974 |

OTHER PUBLICATIONS

Translation for JP 49-20086, Feb. 1974.*
Translation for JP 49-20097, Feb. 1974.*
Zhang Shusheng, et al., "Influence of Flux on Properties of $Y_3Al_5O_{12}$ : Ce Phosphor, " Journal of the Chinese Rare Earth Society, vol. 20, No. 6, Dec. 2002, pp. 605-607.
Kang Kai, et al., "Study on Effect of flux on $CeMgAl_{11}O_{19}$ : $Tb^{3+}$ Phosphor," Journal of Rare Earths, vol. 22, No. 1, Feb. 2004, pp. 114-117.
International Search Report for International Application PCT/CN2007/003205, mailed Feb. 28, 2008.

* cited by examiner

*Primary Examiner*—C. Melissa Koslow
(74) *Attorney, Agent, or Firm*—Staas & Halsey LLP

(57) ABSTRACT

A phosphor can be excited by UV, purple or blue light LED, its production and the light emitting devices. The general formula of the phosphor is $Ln_aM_b(O,F)_{12}:(R^{3+},M'^{2+})_x$, wherein, Ln is at least one metal element selected from a group consisting of Sc, Y, La, Pr, Nd, Gd, Ho, Yb and Sm, $2.6 \leq a \leq 3.4$; M is at least one element selected from a group consisting of B, Al and Ga, $4.5 \leq b \leq 5.5$; R is at least one metal element selected from a group consisting of Ce and Tb; M' is at least one metal element selected from a group consisting of Ca, Sr, Ba, Mn and Zn, $0.001 \leq x \leq 0.4$. The phosphor possesses broad emitting range, high efficiency, better uniformity and stability. A light emitting device can be obtained by incorporating this phosphor into a UV, purple or blue light emitting device.

15 Claims, 2 Drawing Sheets

Figure 1:
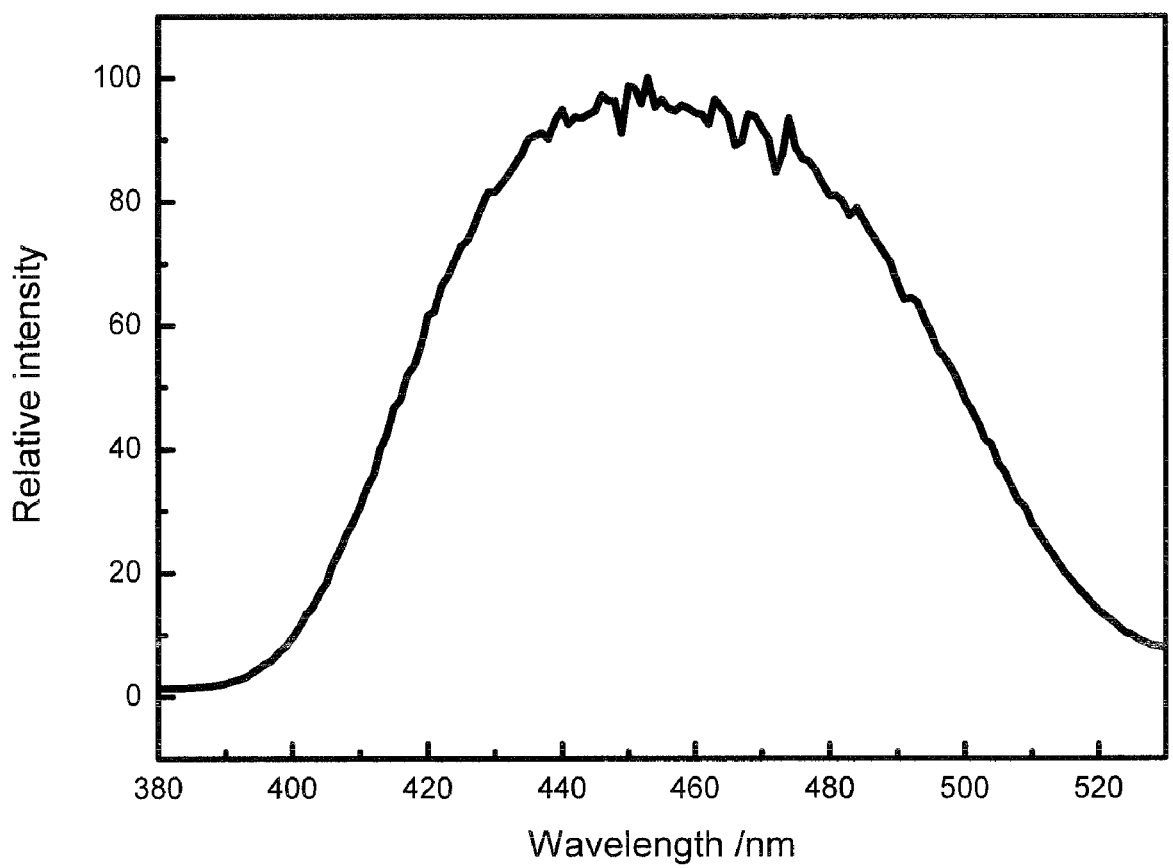

ALUMINATE PHOSPHOR CONTAINING BIVALENCE METAL ELEMENTS, ITS PREPARATION AND THE LIGHT EMITTING DEVICES INCORPORATING THE SAME

CROSS REFERENCE TO RELATED APPLICATION

This application is a continuation application filed under 35 U.S.C. §111(a), claiming the benefit under 35 U.S.C. §120 and §365(c) of a PCT International Application Number PCT/CN2007/003205, filed Nov. 13, 2007, it being further noted that foreign priority benefit is based upon Chinese Patent Application 200610114519.8, filed Nov. 13, 2006 in the State Intellectual Property Office of P.R. China, the disclosures of which are thereby incorporated by reference.

FIELDS OF THE INVENTION

This invention relates to an aluminate phosphor that can be excited by ultraviolet, purple or blue light, its preparation methods and the light emitting devices incorporating the same.

BACKGROUND OF THE INVENTION

Solid state light sources (LEDs, light emitting diodes) have been paid much attention for many years. Since LEDs have many advantages, such as small volume, low power consumption, long lifetime, fast-response, environmental friendliness, high reliability, etc., they are widely used as components in decorating lamps, indicating lamps, etc. According to recent developments, it is possible for LEDs to be advanced into the general lighting field.

As for current LED technologies, white LEDs are recommended to generate by packaging blue LED and phosphors. In U.S. Pat. No. 5,998,925, Nichia achieved the white-light LED by combining $(RE_{1-r}Sm_r)_3(Al_{1-s}Ga_s)_5O_{12}$ yellow phosphor with GaInN blue-light LED. Then, Osram developed $(Tb_{1-x-y}RE_xCe_y)_3(Al,Ga)_5O_{12}$ phosphor for LEDs in U.S. Pat. No. 6,669,866. In 2002, General Research Institute for Nonferrous Metals and Grirem Advanced Materials Co., Ltd made public that the luminous intensity can be improved by coactivation mode in patent CN1482208 (general formula, 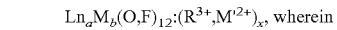). It is thought by the General Electric Company in U.S. Pat. No. 6,409,938 that the quantum efficiency and emission intensity of aluminate phosphor are far away from goals, and they could be improved when $O^{2-}$ is partly substituted by $F^-$.

However, our research results show that bivalent metal element can be introduced to improve the quantum efficiency and emission intensity. The bivalent metal element partly substitutes $Al^{3+}$ or $Y^{3+}$ of the phosphor, and can compensate for the charge center formed by $F^-$ substituting $O^{2-}$, which can promote the light conversion efficiency and improve the stability of this phosphor.

In this invention, the inventors present an aluminate phosphor by co-doped with bivalent metal element and fluorine. This phosphor has a broad excitation range, which can be excited by ultraviolet, purple or blue light, and exhibits high luminous efficiency and good stability. On the other hand, a light emitting device incorporating this phosphor is also concerned.

SUMMARY OF THE INVENTION

One aspect of the present invention is to provide a kind of phosphor that can be excited by ultraviolet, purple or blue light, and has excellent luminescent properties and stability.

Another aspect of the present invention is to provide a light emitting device which is incorporated above mentioned phosphor.

As one embodiment, the phosphor can be represented by the general formula

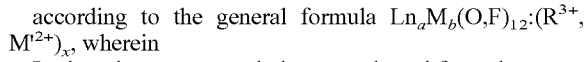

Ln is at least one metal element selected from a group consisting of Sc, Y, La, Pr, Nd, Gd, Ho, Yb and Sm, $2.6 \leq a \leq 3.4$;

M is at least one metal element selected from a group consisting of B, Al and Ga, $4.5 \leq b \leq 5.5$;

R is at least one metal element selected from a group consisting of Ce and Tb; and M' is at least one metal element selected from a group consisting of Ca, Sr, Ba, Mn and Zn, $0.001 \leq x \leq 0.4$.

A preparation method necessary to produce the phosphor described above according to the general formula $Ln_aM_b(O,F)_{12}:(R^{3+}, M'^{2+})_x$, wherein Ln is at least one metal element selected from the group consisting of Sc, Y, La, Pr, Nd, Gd, Ho, Yb and Sm, $2.6 \leq a \leq 3.4$;

M is at least one element selected from the group consisting of B, Al and Ga, $4.5 \leq b \leq 5.5$; and R is at least one metal element selected from the group consisting of Ce and Tb; M' is at least one metal element selected from the group consisting of Ca, Sr, Ba, Mn and Zn, $0.001 \leq x \leq 0.4$, includes the following:

1. selecting elementary substance or compounds (I) of Ln, M, R, M' and fluoride (II) as raw materials, weighing the raw materials according to appropriate stoichiometric ratio, and adding the flux (III) into above raw materials, then mixing and grinding the raw materials together to form a mixture (IV), 2. baking the mixture (IV) at high temperature in reducing atmosphere to form a baked product, and 3. carrying out a post-treatment to the baked product to obtain the phosphor of the present invention.

According to step 1, compounds (I) of Ln, M, R and M' are selected from the group of oxide, hydroxide, carbonate, nitrate and organic salt of Ln, M, R, M', and fluoride (II) is at least one compound selected from fluorides of Ln, M, R, M' and ammonium. Flux (III) is at least one compound selected from the group of alkali halide, alklide-earth halide, $H_3BO_3$, ammonium halide and compounds of Ln, M, R, M'.

According to 1 above, the amount of the flux is 0.01~20% by weight of the mixture (IV).

According to 1 above, the starting materials could be mixed and grinded in alcohol, acetone or water.

According to 2 above, baking can be operated once, twice or more.

According to 2 above, the temperature of baking is in the range of 500~1600° C.

According to 2 above, each baking should last for 0.5~30 h.

According to 3 above, post-treatment involves grinding, air flow crushing, washing, drying and grading, etc.

According to 3 above, the washing in post-treatment uses acid solution, alkali solution or water.

According to 3 above, the grading step in post-treatment can be at least a method selected from sieving method, hydraulic classification and air flow grading.

It is easily found that the above synthetic method for producing the phosphor of the present invention is advantageous for being very simple, involving no pollution and having low cost. This phosphor can be excited by UV, purple or blue light, and then emits broadband visible light with wavelengths peaking at 500-600 nm and having full width at half maximum (FWHM) beyond 30 nm. That is to say, the phosphor in present invention can be satisfied with UV, purple or blue LED. Thus the present phosphor can be incorporated directly or along with other phosphors into LEDs to produce white or color light emitting devices.

In accordance with an aspect of the present invention, a light emitting device can be produced by combining the phosphor of the present invention with at least one kind of LED, such as UV, purple or blue LED. The phosphor can be expressed by general formula:

$$Ln_aM_b(O,F)_{12}:(R^{3+},M'^{2+})_x, \text{ wherein}$$

Ln is at least one metal element selected from a group consisting of Sc, Y, La, Pr, Nd, Gd, Ho, Yb and Sm, $2.6 \leq a \leq 3.4$;

M is at least one metal element selected from a group consisting of B, Al and Ga, $4.5 \leq b \leq 5.5$;

R is at least one metal element selected from a group consisting of Ce and Tb; and M' is at least one metal element selected from a group consisting of Ca, Sr, Ba, Mn and Zn, $0.001 \leq x \leq 0.4$.

In the above-mentioned light emitting devices, other phosphors can be introduced.

1 The above-described phosphors of the present invention have novel composition and excellent luminescent properties and stability.

The preparation methods for producing the phosphors are simple, involving no pollution and having lower cost.

New light emitting devices can be obtained by incorporating the phosphor into LED, which have long lifetime and high luminous efficiency.

BRIEF DESCRIPTIONS OF THE DRAWINGS

Figure 2:
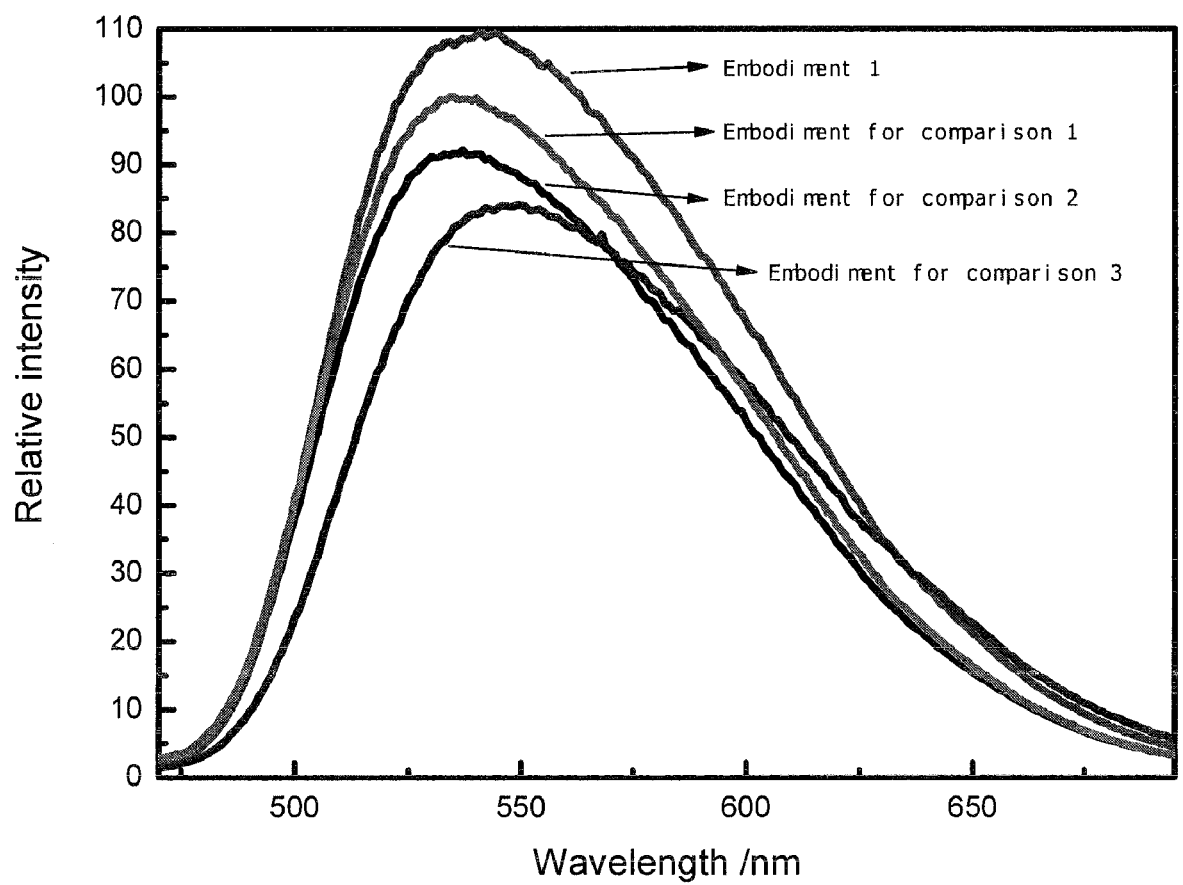

FIG. 1 shows the excitation spectrum of Example 1;
FIG. 2 shows the emission spectra of the samples of Examples 1, and 2 and Comparative Examples 1-3.

DETAILED DESCRIPTION OF THE EXAMPLES

Example 1

Raw materials $Y_2O_3$ (4N), $BaCO_3$ (4N), $Al_2O_3$ (4N), $CeO_2$ (4N) and $NH_4F$ (AR) are weighed with appropriate stoichiometric ratio. $NH_4F$ (AR) acts as both reactant and flux. Preparation of this Phosphor is Carried Out with Mixing and Grinding of these Materials, and baking at 1450° C. for 3 hours in reducing atmosphere. After that, the phosphor $Y_{2.75}Al_5O_{11.8}F_{0.2}:(Ce_{0.05},Ba_{0.2})$ can be obtained by crushing, washing, drying and sieving sequentially. The excitation spectrum and emission spectrum are shown in FIG. 1, it can be seen that the phosphor can be excited by UV, purple and blue light and emits 541 nm yellow light.

Comparative Example 1

Raw materials $Y_2O_3$ (4N), $Al_2O_3$ (4N), $CeO_2$ (4N) and $AlF_3$ (4N) are weighed with appropriate stoichiometric ratio. $AlF_3$ (4N) acts as both reactant and flux. Preparation of the Phosphor is Carried Out with Mixing and Grinding of these Materials, and baking at 1450° C. for 3 hours in reducing atmosphere. After that, the phosphor $Y_{2.95}Al_5O_{11.8}F_{0.2}:Ce_{0.05}$ can be obtained by crushing, washing, drying and sieving sequentially.

Comparative Example 2

Raw materials $Y_2O_3$ (4N), $Al_2O_3$ (4N), $CeO_2$ (4N) and $YF_3$ (4N) are weighed with appropriate stoichiometric ratio. $YF_3$ (4N) acts as both reactant and flux. Preparation of the phosphor is carried out with mixing and grinding of these materials, and baking at 1450° C. for 3 hours in reducing atmosphere. After that, the phosphor $Y_{2.95}Al_5O_{11.8}F_{0.2}:Ce_{0.05}$ can be obtained by crushing, washing, drying and sieving sequentially.

Comparative Example 3

Raw materials $Y_2O_3$ (4N), $Al_2O_3$ (4N), $CeO_2$ (4N) and $H_3BO_3$ (AR) are weighed with appropriate stoichiometric ratio. $H_3BO_3$ (AR) acts as flux. Preparation of the phosphor is carried out with mixing and grinding of these materials, and baking at 1450° C. for 3 hours in reducing atmosphere. After that, the phosphor $Y_{2.95}Al_5O_{12}:Ce_{0.05}$ can be obtained by crushing, washing, drying and sieving sequentially.

The main emission peak wavelength and relative intensity of the phosphors of the above examples are shown in Table 1. It can be found that bivalence metal element improves the emission intensity of the phosphor greatly.

TABLE 1

| Examples | Emission peak/nm | Relative intensity (%) |
|---|---|---|
| Example 1 | 541 | 109 |
| Comparative Example 1 | 539 | 100 |
| Comparative Example 2 | 538 | 92 |
| Comparative Example 3 | 543 | 84 |

Examples 2-11

Each sample is synthesized according to the corresponding formula as shown in Table 2 respectively. Hosts, activators and fluxes are changed in those embodiments. Synthetic method is the same as Example 1. The main emission peak wavelength and relative intensity of the phosphors for these embodiments are shown in Table 2.

TABLE 2

| Examples | Formula | Emission peak/nm | Relative intensity (%) |
|---|---|---|---|
| Comparative Example 1 | $Y_{2.95}Al_5O_{11.8}F_{0.2}: Ce_{0.05}$ | 539 | 100 |

TABLE 2-continued

| Examples | Formula | Emission peak/nm | Relative intensity (%) |
|---|---|---|---|
| Example 2 | $Y_{2.7}Al_5O_{11.75}F_{0.25}$: $(Ce_{0.05},Ca_{0.25})$ | 541 | 119 |
| Example 3 | $Y_{2.2}Sc_{1.0}Al_5O_{11.7}F_{0.3}$: $(Ce_{0.05},Sr_{0.3})$ | 543 | 118 |
| Example 4 | $Y_{1.7}La_{0.5}Gd_{0.5}Al_{4.5}B_{0.5}O_{11.75}F_{0.25}$: $(Ce_{0.05},Ba_{0.25})$ | 547 | 113 |
| Example 5 | $Y_{1.7}Pr_{0.5}Gd_{1.0}Al_5O_{11.7}F_{0.3}$: $(Ce_{0.05},Mn_{0.3})$ | 553 | 116 |
| Example 6 | $Y_{2.5}Nd_{0.5}Al_{4.7}O_{11.7}F_{0.3}$: $(Ce_{0.05},Ca_{0.3})$ | 543 | 121 |
| Example 7 | $Y_{2.5}Ho_{0.5}Al_{5.2}O_{11.85}F_{0.15}$: $(Ce_{0.1},Zn_{0.15})$ | 542 | 117 |
| Example 8 | $Y_{2.5}Yb_{0.5}Al_4Ga_{0.7}O_{11.7}F_{0.3}$: $(Ce_{0.05},Ba_{0.3})$ | 527 | 127 |
| Example 9 | $Y_{2.5}Sm_{0.5}Al_4Ga_{1.2}O_{11.999}F_{0.001}$: $(Ce_{0.003},Zn_{0.001})$ | 522 | 105 |
| Example 10 | $Y_{2.7}Al_5O_{11.75}F_{0.25}$: $(Ce_{0.05},Tb_{0.01},Ca_{0.25})$ | 545 | 109 |
| Example 11 | $Y_{2.5}Nd_{0.5}Al_{4.7}O_{11.7}F_{0.3}$: $(Ce_{0.05},Tb_{0.05},Ca_{0.3})$ | 547 | 105 |

Example of Light Emitting Device

White light emitting device can be obtained by incorporating the phosphor of Example 1 into a GaInN blue light LED. The powder of the phosphor is firstly dispersed in resin, and then coated on a GaInN LED chip. After welding circuit and packaging, a white light emitting device is produced.

INDUSTRIAL APPLICABILITY

The above-described phosphor is readily produced and shows high emission intensity in light emitting device, and a light emitting device using the phosphor are provided.

The invention claimed is:

1. A phosphor, comprising a host material with luminescent center represented by the general formula $Ln_aM_bO_{12-z1}F_{z1}:R_{z2}M'_{z1}$, wherein, Ln is at least two metal elements selected from the group consisting of Sc, Y, La, Pr, Nd, Gd, Ho, Yb and Sm, $2.6 \leq a \leq 3.4$;

M is at least one metal element selected from the group consisting of B, Al and Ga, $4.5 \leq b \leq 5.5$;

O and F are related in the ratio of "12-z1" to "z1", where $0.001 \leq z1 \leq 0.3$;

R is at least one metal element selected from the group consisting of Ce and Tb;

M' is at least one metal element selected from the group consisting of Ca, Sr, Ba, Mn and Zn; and R and M' are related in the ratio of "z2" to "z1", where $0.003 \leq z2 \leq 0.1$;

"z2+z1=x"; and $0.004 \leq x \leq 0.4$.

2. A method of producing a phosphor, comprising:

selecting elementary substances or compounds of Ln, M, R, M' and fluoride as raw materials, weighing according to appropriate stoichiometric ratio, and adding flux into above raw materials, mixing and grinding the raw materials together to form a mixture, baking the mixture at high temperature in reducing atmosphere at least once to form a baked product, carrying out a post-treatment to obtain the phosphor, wherein the phosphor is a host material with luminescent center represented by the general formula $Ln_aM_bO_{12-z1}F_{z1}:R_{z2}M'_{z1}$, wherein, Ln is at least two metal elements selected from the group consisting of Sc, Y, La, Pr, Nd, Gd, Ho, Yb and Sm, $2.6 \leq a \leq 3.4$;

M is at least one metal element selected from the group consisting of B, Al and Ga, $4.5 \leq b \leq 5.5$;

O and F are related in the ratio of "12-z1" to "z1", where $0.001 \leq z1 \leq 0.3$;

R is at least one metal element selected from the group consisting of Ce and Tb; and M' is at least one metal element selected from the group consisting of Ca, Sr, Ba, Mn and Zn; and R and M' are related in the ratio of "z2" to "z1", where $0.003 \leq z2 \leq 0.1$;

"z2+z1=x"; and $0.004 \leq x \leq 0.4$.

3. The method according to claim 2, wherein the compounds of Ln, M, R and M' are selected from the group of oxide, hydroxide, carbonate, nitrate and organic salt of Ln, M, R, M'; fluoride is at least one compound selected from fluorides of Ln, M, R, M' and ammonium; and fluxis at least one compound selected from the group of alkali halide, alklide-earth halide, $H_3BO_3$, ammonium halide and compounds of Ln, M, R, M'.

4. The method according to claim 2, wherein the amount of the flux is 0.01~20% by weight of the mixture.

5. The method according to claim 2, wherein baking in reducing atmosphere can be operated once or twice.

6. The method according to claim 2, wherein the temperature of baking is in the range of 500~1600° C.

7. The method according to claim 2, wherein baking is 0.5~30 h.

8. The method according to claim 2, wherein post-treatment is at least one member selected from the group consisting grinding, air flow crushing, washing, drying and grading.

9. The method according to claim 8, wherein the washing in post-treatment uses acid solution, alkali solution or water.

10. The method according to claim 8, wherein the grading in post-treatment is at least a method selected from the group consisting of, sieving method, hydraulic classification and air flow grading.

11. A light emitting device, comprising: the phosphor of claim 1 and LED which is capable of emitting a light in the range from ultraviolet to blue light.

12. The light emitting device according to claim 11, further comprising at least one additional phosphor.

13. The phosphor according to claim 1, wherein the phosphor is a member selected from the group consisting of:

$Y_{2.2}Sc_{1.0}Al_5O_{11.7}F_{0.3}$:$(Ce_{0.05},Sr_{0.3})$, $Y_{1.7}La_{0.5}Gd_{0.5}Al_{4.5}B_{0.5}O_{11.75}F_{0.25}$:$(Ce_{0.05},Ba_{0.25})$, $Y_{1.7}Pr_{0.5}Gd_{1.0}Al_5O_{11.7}F_{0.3}$:$(Ce_{0.05},Mn_{0.3})$, $Y_{2.5}Nd_{0.5}Al_{4.7}O_{11.7}F_{0.3}$:$(Ce_{0.05},Ca_{0.3})$, $Y_{2.5}Ho_{0.5}Al_{5.2}O_{11.85}F_{0.15}$:$(Ce_{0.1},Zn_{0.15})$, $Y_{2.5}Yb_{0.5}Al_4Ga_{0.7}O_{11.7}F_{0.3}$:$(Ce_{0.05},Ba_{0.3})$, $Y_{2.5}Sm_{0.5}Al_4Ga_{1.2}O_{11.999}F_{0.001}$:$(Ce_{0.003},Zn_{0.001})$, and $Y_{2.5}Nd_{0.5}Al_{4.7}O_{11.7}F_{0.3}$:$(Ce_{0.05},Tb_{0.05},Ca_{0.3})$.

14. The method according to claim 2, wherein the phosphor is a member selected from the group consisting of:

$Y_{2.2}Sc_{1.0}Al_5O_{11.7}F_{0.3}$:($Ce_{0.05}$,$Sr_{0.3}$),
$Y_{1.7}La_{0.5}Gd_{0.5}Al_{4.5}B_{0.5}O_{11.75}F_{0.25}$:($Ce_{0.05}$,$Ba_{0.25}$),
$Y_{1.7}Pr_{0.5}Gd_{1.0}Al_5O_{11.7}F_{0.3}$:($Ce_{0.05}$,$Mn_{0.3}$),
$Y_{2.5}Nd_{0.5}Al_{4.7}O_{11.7}F_{0.3}$:($Ce_{0.05}$,$Ca_{0.3}$),
$Y_{2.5}Ho_{0.5}Al_{5.2}O_{11.85}F_{0.15}$:($Ce_{0.1}$,$Zn_{0.15}$),
$Y_{2.5}Yb_{0.5}Al_4Ga_{0.7}O_{11.7}F_{0.3}$:($Ce_{0.05}$,$Ba_{0.3}$),
$Y_{2.5}Sm_{0.5}Al_4Ga_{1.2}O_{11.999}F_{0.001}$:($Ce_{0.003}$,$Zn_{0.001}$),
and
$Y_{2.5}Nd_{0.5}Al_{4.7}O_{11.7}F_{0.3}$:($Ce_{0.05}$,$Tb_{0.05}$,$Ca_{0.3}$).

15. The light emitting device according to claim 11, wherein the phosphor is a member selected from the group consisting of $Y_{2.2}Sc_{1.0}Al_5O_{11.7}F_{0.3}$:($Ce_{0.05}$,$Sr_{0.3}$),
$Y_{1.7}La_{0.5}Gd_{0.5}Al_{4.5}B_{0.5}O_{11.75}F_{0.25}$:($Ce_{0.05}$,$Ba_{0.25}$),
$Y_{1.7}Pr_{0.5}Gd_{1.0}Al_5O_{11.7}F_{0.3}$:($Ce_{0.05}$,$Mn_{0.3}$),
$Y_{2.5}Nd_{0.5}Al_{4.7}O_{11.7}F_{0.3}$:($Ce_{0.05}$,$Ca_{0.3}$),
$Y_{2.5}Ho_{0.5}Al_{5.2}O_{11.85}F_{0.15}$:($Ce_{0.1}$,$Zn_{0.15}$),
$Y_{2.5}Yb_{0.5}Al_4Ga_{0.7}O_{11.7}F_{0.3}$:($Ce_{0.05}$,$Ba_{0.3}$),
$Y_{2.5}Sm_{0.5}Al_4Ga_{1.2}O_{11.999}F_{0.001}$:($Ce_{0.003}$,$Zn_{0.001}$),
and
$Y_{2.5}Nd_{0.5}Al_{4.7}O_{11.7}F_{0.3}$:($Ce_{0.05}$,$Tb_{0.05}$,$Ca_{0.3}$).

* * * * *

UNITED STATES PATENT AND TRADEMARK OFFICE
CERTIFICATE OF CORRECTION

PATENT NO. : 7,850,869 B2  
APPLICATION NO. : 12/465381  
DATED : December 14, 2010  
INVENTOR(S) : Weidong Zhuang et al.

Page 1 of 1

It is certified that error appears in the above-identified patent and that said Letters Patent is hereby corrected as shown below:

Column 6, Line 31, In Claim 3, delete "fluxis" and insert --fluxes--, therefor.

Column 6, Line 49, In Claim 10, delete "of," and insert --of--, therefor.

Signed and Sealed this
Third Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,850,869 B2 | Page 1 of 1 |
| APPLICATION NO. | : 12/465381 | |
| DATED | : December 14, 2010 | |
| INVENTOR(S) | : Weidong Zhuang et al. | |

It is certified that error appears in the above-identified patent and that said Letters Patent is hereby corrected as shown below:

Column 6, Line 31, In Claim 3, delete "fluxis" and insert --flux is--, therefor.

Column 6, Line 49, In Claim 10, delete "of," and insert --of--, therefor.

This certificate supersedes the Certificate of Correction issued May 3, 2011.

Signed and Sealed this
Sixteenth Day of August, 2011

David J. Kappos
*Director of the United States Patent and Trademark Office*